United States Patent [19]

Hashimoto et al.

[11] 4,003,068
[45] Jan. 11, 1977

[54] EXTENSION TUBE FOR USE IN CLOSE-UP PHOTOGRAPHY

[75] Inventors: Shigeru Hashimoto, Yokohama; Masaharu Ito, Tokyo, both of Japan

[73] Assignee: Canon Kabushiki Kaisha, Tokyo, Japan

[22] Filed: Nov. 11, 1975

[21] Appl. No.: 631,129

[30] Foreign Application Priority Data

Nov. 26, 1974 Japan .................. 49-136525
Nov. 26, 1974 Japan .................. 49-136526
Nov. 26, 1974 Japan .................. 49-136527
Nov. 26, 1974 Japan .................. 49-136528

[52] U.S. Cl. .................. 354/286; 354/46
[51] Int. Cl.² .................. G03B 17/56
[58] Field of Search .......... 354/197, 286, 289, 295, 354/46; 350/37, 38, 39, 183, 257

[56] References Cited

UNITED STATES PATENTS

| 3,500,735 | 3/1970 | Mite et al. ............ 354/202 |
| 3,590,715 | 6/1971 | Schops ............ 354/202 X |
| 3,722,390 | 3/1973 | Schlapp et al. ............ 354/289 X |
| 3,782,261 | 1/1974 | Araki ............ 354/289 X |
| 3,879,741 | 4/1975 | Saito et al. ............ 354/295 X |

Primary Examiner—L. T. Hix
Assistant Examiner—Edna M. O'Connor
Attorney, Agent, or Firm—Toren, McGeady and Stanger

[57] ABSTRACT

An extension tube inserted between a single lens reflex camera body and an interchangeable objective lens barrel to extend the photographable range intrinsic to the camera is provided with an aperture value transmitting device through which the diaphragm on the lens barrel side is presettable as the aperture value is determined on the camera body side, thereby it being made possible to effect automatic exposure aperture control when making an exposure at a camera-to-object distance shorter than the lower limit of the photographable range. A transmitting device, for coupling the lens and camera, is also provided for achieving manual exposure control.

6 Claims, 7 Drawing Figures

EXTENSION TUBE FOR USE IN CLOSE-UP PHOTOGRAPHY

This invention relates to photographic cameras, and more particularly to an intermediate barrel which when assembled with a single lens reflex camera as inserted between the body of the camera and the interchangeable objective lens barrel thereof extends the photographable range toward the close distance.

For close photography application of a single lens reflex camera, it has been the widely accepted practice in the prior art to insert an intermediate barrel, or so-called "extension tube" between the camera body and the interchangeable objective lens barrel associated therewith. It is also known a type of intermediate barrels in which there is provided transmitting means as arranged to permit manipulation of the diaphragm of the interchangeable lens from the camera side as disclosed, for example, in Japanese Utility Model Publication No. Sho 43-16862.

This conventional type, however, lacks the means for transmitting diaphragm-presetting movement between the camera body and the interchangeable lens barrel, so that in the case of a camera of the type in which the aperture value is determined by the automatic diaphragm control apparatus on the camera body, and is then introduced into the diaphragm on the lens barrel side, it is made impossible for the automatic diaphragm control apparatus to cooperate with the diaphragm mechanism.

An object of the present invention is to provide an intermediate barrel which permits either for automatic presetting of the diaphragm, or for manual presetting of the diaphragm when the single lens reflex camera assembled therewith is respectively of the type in which the aperture value determined by the automatic diaphragm control apparatus on the camera body side is transmitted to the interchangeable lens barrel side to effect automatic presetting of the diaphragm, or of the type having a full open aperture light metering type exposure meter with its output member or needle arranged to cooperate with a manually operable diaphragm preselecting ring in such a manner that automatic presetting of the diaphragm is effected by bringing the needle-follower in alignment with the exposure meter needle or by turning the exposure meter housing to effect alignment of the needle with a stationary index.

To achieve this, the intermediate barrel is provided with diaphragm presetting motion transmitting means arranged to be engageable both with the aperture value determining means on the camera side and with the diaphragm presetting means on the interchangeable lens barrel.

Another object of the invention is to provide an intermediate barrel of a type having means for selecting either of the automatic and manual control modes by taking account of the characters of the employed camera body and interchangeable lens.

Still another object of the invention is to provide an intermediate barrel constructed in a manner to insure that the aforesaid transmitting means is brought into operative engagement with the output member of the automatic diaphragm control apparatus without failure when the intermediate barrel is assembled with the camera body.

Other objects and features of the invention will become apparent from the following detailed description taken in conjunction with the accompanying drawings in which -

Figure 1:
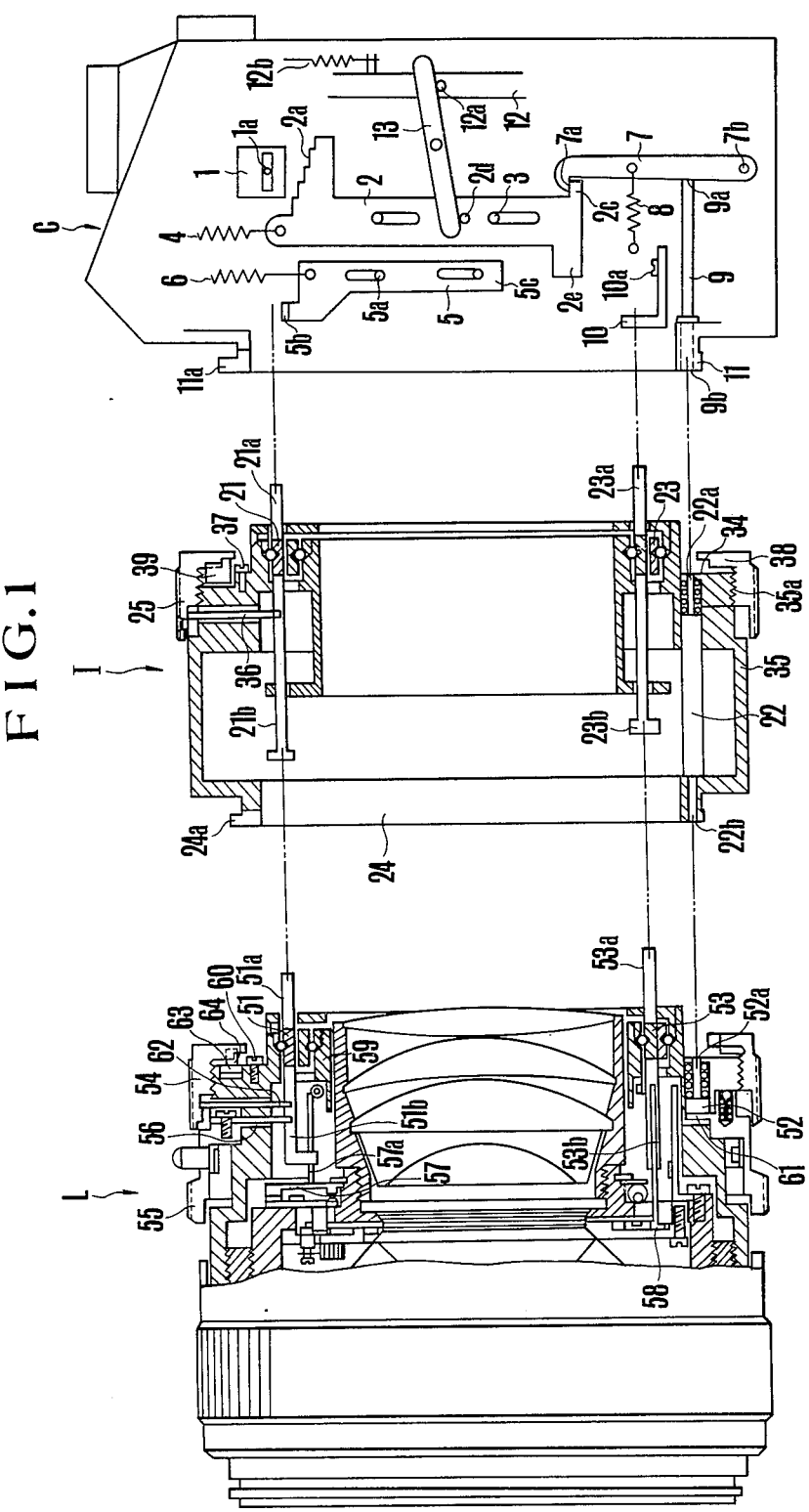
FIG. 1 is a sectional elevational view showing one embodiment of an intermediate barrel according to the present invention adapted for use with a single lens reflex camera of the type having an automatic diaphragm control apparatus, the camera body, intermediate barrel and objective lens barrel being shown as spread along the optical axis of the camera as they would appear before assembly.
Figure 2:
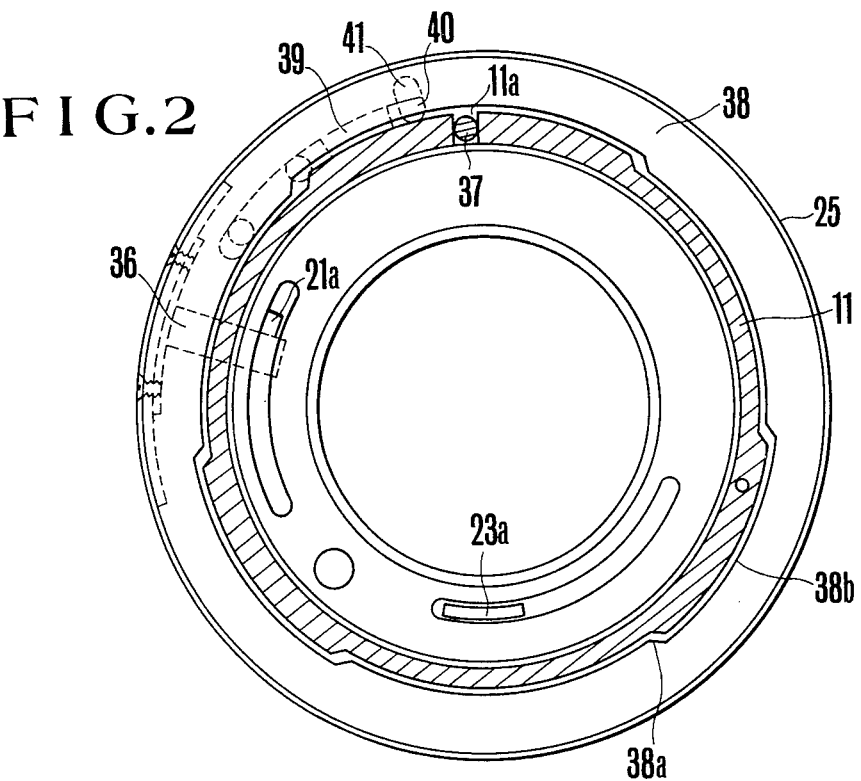
FIG. 2 is a rear elevation view of the intermediate barrel of FIG. 1.
Figure 3:
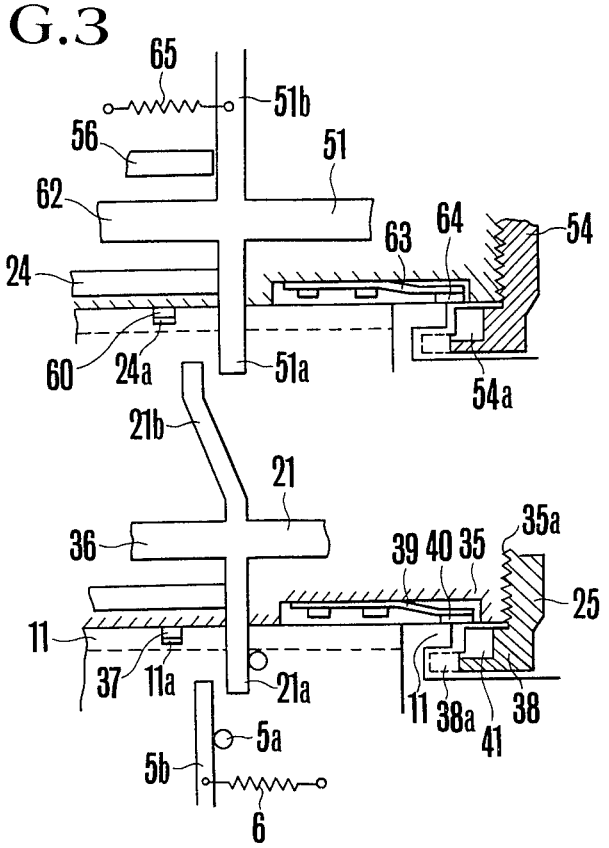
FIG. 3 is a fragmentary sectional elevation view showing an engaging arrangement of the output member of the automatic diaphragm control apparatus and the diaphragm presetting motion transmitting device of the invention occurring when the entire assembly is completed.

Referring to FIGS. 1, 2 and 3 and first to FIG. 1, there is shown one embodiment of an intermediate barrel or extension tube according to the present invention adapted for use with a single lens reflex camera of the type having an automatic diaphragm control apparatus. The camera is shown as having a body C and an interchangeable objective lens barrel L. The automatic diaphragm control apparatus incorporated in the camera body C comprises an exposure meter 1 which determines the value of diaphragm aperture as a function of scene brightness when the camera is set to operate in the automatic diaphragm control range. The exposure meter 1 has an output member or needle 1a which is movable along a fixed back support or abutment not shown, and of which the position can be detected by a scanning member constructed in the form of a slide 2 having a stepped scanning face 2a which can urge the needle 1a against the abutment when the scanning slide 2 is actuated. The scanning slide 2 has a pair of elongated slots for respective fixed guide pins 3, and is biased upwardly by a helical spring 4 as viewed in FIG. 1. The spring 4 tends to move the scanning face 2a into abutting engagement with the needle 1a of the exposure meter 1. The slide 2 is normally held in the shutter-cocked position by a shutter release member which comprises a shaft 12 having a shutter button at the top end thereof and upwardly biased by a helical return spring 12b, and a lever 13 abutting at one end thereof against a pin 12a mounted on the shaft 12 and at the other end thereof against a pin 2d mounted on the slide 2. As the bias of the spring 12b is stronger than that of the spring 4, the initiation of upward or downward movement of the scanning slide 2 is controlled by the shutter release member.

A second slide 5 is provided for serving as a transmitting member of the value of the diaphragm aperture. The slide 5 has a pair of elongated slots in which respective fixed guide pins 5a are engaged, and is biased upward by a helical spring 6 which tends to maintain the slide 5 in positive engagement at its rectangularly bent portion 5b with an input member of a diaphragm presettig ring 57 in the lens barrel L when the lens barrel L is attached to the housing of the camera body C. The slide 5 has one end 5c arranged to be engageable with a perpendicularly extending projection 2e of the scanning slide 2 when the camera is set to operate in the automatic diaphragm control mode by turning a diaphragm preselecting ring 55 on the associated lens barrel L to place the symbol EE in registry with a stationary index not shown in a manner known in the art.

The provision for switching the camera between the automatic and manual diaphragm control modes is made at a latching lever 7 which is fulcrumed at a pivot pin 7b and which is biased in the counter-clockwise direction by a helical spring 8 to urge the pawl 7a for latching engagement with a perpendicularly extending projection 2c of the scanning slide 2. Cooperating with the pawl lever 7 is an actuating rod 9 arranged to be movable in parallel with the optical axis of the objective lens to the retracted position when the symbol EE on the diaphragm preselecting ring 55 is placed in registry with the index, while causing the lever pawl 7a to be disengaged from the scanning slide projection 2c as the lever 7 is turned clockwise in engagement with one end 9a of the actuating rod 9 against the force of spring 8. A diaphragm drive member is indicated at 10 which is constructed in the form of a lever pivoted at a pin 10a arranged to be pre-tensioned when the shutter is cocked and to be operated in response to the shutter release. The housing of the camera body C has an acceptor mount base ring 11 at the front in concentric relation to the optical axis of the camera, and the front end of the ring 11 constitutes a male bayonet coupling. The ring 11 is provided with a grooved portion 11a arranged so that when the lens barrel L is attached to the camera housing in a depending angular position where a pin 60 fixedly mounted on the radial rear flange of a guide barrel of the lens barrel L is received in the grooved portion 11a, the various input members of the lens barrel L are brought into operative engagement with the various respective output members of the camera body C without failure.

The lens barrel L serving as a mechanical mounting unit for the objective lens carries an adaptor ring 54 whose rear end constitutes a female bayonet coupling relative to the male bayonet coupling of the acceptor mount base ring 11 and which is rotatably mounted around a portion of the guide barrel in threaded connection with each other. The adapter ring 54 has an arm 62 radially extending into the path of rotative movement of a front arm 51b of a diaphragm control ring 51 about the optical axis of the lens, so that when the adapter ring 54 is set in the detached or demounted position, the arm 62 causes the diaphragm control ring 51 to assume a full open aperture position in which the rear arm 51a can be brought into operative engagement with the projection 5b of the transmitting slide 5 without failure when the lens barrel L is attached to the camera housing in alignment of the pin 60 with the grooved portion 11a. In order to insure that the adapter ring 54 remains in the full open aperture position despite of the fact that a spring 65 (see FIG. 3) tends to move the diaphragm control ring 51 to the minimum aperture position in engagement with the arm 62 of the adapter ring 54, there is provided a locking mechanism which, as more clearly shown in FIG. 3, comprises a spring plate 63 mounted in a recessed portion provided in the rear radial flange of the guide barrel, a pin 64 mounted on the free end of the spring plate 63 and having such a height that when the lens barrel is attached to the camera housing, the pin 64 is completely retracted into the recessed portion, and a cutout 54a provided in the adapter ring 54 at a location such that when the adapter ring 54 is set in the full open aperture position and when it is detached form the camera housing, a portion of the pin 64 enters the cutout 54a to lock the adapter ring 54 from movement relative to the guide barrel, whereby the diaphragm control ring 51 is secured in the full open aperture position. After the lens barrel L is attached to the camera housing in engagement of the pin 60 with the grooved portion 11a, the adapter ring 54 may be turned to the rigidly secured position wherein the arm 62 is retired from the path of movement of the front arm 51b of the diaphragm control ring 51 to permit operation of the diaphragm control ring 51 over the entire range of aperture sizes, as the position of the diaphragm control ring 51 is controlled either by the manually operable diaphragm preselecting ring 55 in abutting engagement at its arm 56 with the front arm 51b of the diaphragm control ring 51 under the action of the spring 65, or by the automatic diaphragm control apparatus of the camera engaging the rear arm 51a of the diaphragm control ring 51. When the diaphragm preselecting ring 55 is turned to place the symbol EE beyond the manually operating diaphragm range adjacent the minimum aperture size limit thereof in registry with the index, the diaphragm control ring 51 is moved toward the minimum aperture position while moving the transmitting slide 5 toward the downmost position, because the bias of the spring 6 is weaker than that of the spring 65. The registration of the symbol EE with the index further causes a cam follower pin 52 to rearwardly move in sliding contact relation at its head with a camming surface 61 provided in the diaphragm preselecting ring 55. The rearward movement of the cam follower pin 52 causes the actuating rod 9 to move to the retracted position in the pin end 52a-and-rod end 9b connection, thereby the latching lever 7 is turned clockwise against the force of the spring 8 to disengage the lever pawl 7a from the scanning slide projection 2c.

The lens barrel L further includes a diaphragm presetting ring 57 rotatable about the axis of the optical axis and having an arm 57a rearwardly extending in parallel to the optical axis. The arm 57a is connected with the front arm of the diaphragm control ring 51 so that they are relatively movable with respect to each other only in the longitudinal direction but not in the angular direction. The diaphragm presetting ring 57 is provided with a camming surface formed in a portion thereof and cooperative with a bell-crank lever not shown of construction known in the art at one end thereof, the other end of which extends into the path of movement of a diaphragm drive ring 58 to serve as a stopper for the drive ring 58 as the drive ring 58 is moved from the maximum to the minimum aperture position when the diaphragm is operated. The presetting ring 57 is biased by the spring 65 through a not shown intermediary to insure the cooperation with the diaphragm preselecting ring 55. The diaphragm drive ring 58 is biased by a relatively weak spring not shown in a direction from the maximum to the minimum aperture position, and has an arm 58 extending rearwardly in parallel with the optical axis and engaging an arm of a diaphragm operating ring 53 which is biased by a relatively strong spring not shown from the minimum to the maximum aperture position, so that the diaphragm drive ring 58 is normally held in the maximum aperture position. The diaphragm operating ring 58 is mounted on a lens holder sleeve 59 to journal thereabout through an intermediary of a number of ball bearings. Mounted on the operating ring 58 is the diaphragm control ring 51 to be movable independent of the ring 58 in radial alignment therewith. The operating ring 58 has another arm 53a extending rearwardly to the path of movement of the diaphragm drive lever 10 for cooperation therewith.

The intermediate barrel I of the invention is shown as comprising a tubular body 35 whose front and rear ends are provided with an acceptor mount base ring 24 and adapter ring 25 respectively similar in construction and performance to the aforesaid rings 11 and 54, an aperture value transmitting ring 21, a diaphragm driving motion transmitting ring 23 and a diaphragm control mode selecting signal transmitting rod 22. The rings 21 and 23 are mounted in radial alignment with each other within the tubular body 35 to be movable independently of each other about the optical axis in longitudinally aligning relation with the aforesaid rings 51 and 53 respectively, and have respective front and rear arms 21b, 23b, and 21a, 23a which when the intermediate barrel I fixedly secured between the camera body C and the lens barrel L at a depending angular position, establish respective interconnections between the diaphragm control ring 51 and the automatic diaphragm control apparatus and between the diaphragm operating ring 53 and the drive lever 10. In order to facilitate the establishment of the correct interconnection between the ring 53 and drive lever 10, there is provided a weak spring not shown which tends to maintain the ring 23 in a predetermined position so long as the intermediate barrel I is detached from the camera. The signal transmitting rod 22 is arranged in longitudinal alignment with the cam follower pin 52 and with the actuating rod 9, and is mounted within the tubular body 35 to be slidably movable in parallel with the optical axis, and is biased by an expansion spring toward the front, so that when the intermediate barrel I is detached from the camera, or when the camera with the intermediate barrel I is set in the manual diaphragm control mode, the front end surface 22b of the rod 22 is disposed at a location almost coincident with the front surface of the acceptor mount base ring 24, and the rear end surface 22a of the rod 22 is also disposed at a location almost coincident with the rear attachment surface 34 of the tubular body 35.

The adaptor ring 25 is rotatably mounted on the rear end portion of the tubular body 35 by the threaded connection 35a and has a radial flange 38 constituting a bayonet coupling with its three projected portions 38a and three recessed portion 38b being arranged in mating relation with those of the acceptor mount base ring 11 as shown in FIG. 2. The attachment surface 34 of the tubular body 35 against the mount base ring 11 is provided with a recessed portion in which a plate spring 39 is mounted. Mounted on the free end of the plate spring 39 is a pin 40 which is normally urged toward the flange 38 under the action of the plate spring 39, and which is aligned with a groove 41 provided in the flange 38, so that when the ring 25 is in the released position, the pin 40 enters the groove 41 to prevent rotation of the ring 25 relative to the tubular body 35. When the intermediate barrel I is attached to the housing of the camera body C in engagement at the pin 37 with the groove portion 11a the pin 40 is retracted from the groove 41, as it is brought into engagement at a portion thereof with the projected portion of the flange of the ring 11 as shown in FIGS. 2 and 3. The adaptor ring 25 is further provided with an arm 36 radially inwardly extending into the path of movement of the front arm 21b of ring 21, and arranged so that when the ring 25 is in the released position, the ring 21 is latched in a position corresponding to the full open aperture, while when the ring 25 is turned to the rigidly secured position, the arm 36 is retired from the path of movement of the front arm 21b.

For assembling the intermediate barrel I and the camera body C, the intermediate barrel I is brought into attachment to the housing of the camera body C in the direction parallel to the optical axis while the angular position control pin 37 being in longitudinal alignment with the grooved portion 11a. At this time, the mating relation between the bayonet couplings of the rings 11 and 25 is established, and simultaneously the pin 40 is retracted from the groove 41 against the force of spring 39 as the head of the pin 40 engages at a portion thereof with one of the bayonet pawls of the ring 11 as shown in FIG. 3. It is now to be noted that although the length of gap between the rear arm 21a and the transmitting slide arm 5b is very small, there is no possibility for the rear arm 21a of entering the under side of the arm 5c because of the assistance of the position control pin 37 and the arm 36. Next, the adaptor ring 25 may be turned from the attached position to the rigidly secured position, as the projected portions 38a of the flange 38 enter spaces behind the respective bayonet pawls of the ring 11 and the threaded connection between the rings 11 and 25 causes forward advancement of the ring 25 relative to the ring 11. In this operation, the arm 36 is moved to the left as viewed in the FIG. 3 to release the rear arm 21a therefrom, but the position of the arm 21a remains unchanged because of no application of particular force thereto. The downward movement of the arm 21a is prevented under the action of the spring 6. On the other hand, the diaphragm driving motion transmitting ring 23 is biased by the spring as mentioned before to ensure that the rear arm 23a is brought into correct engagement with the diaphragm drive lever 10.

For assembling the interchangeable lens barrel L and the intermediate barrel I, the lens barrel L is brought into attachment at the adapter ring 54 to the acceptor mount base ring 24 of the intermediate barrel I in the direction parallel to the optical axis, while the angular position control pin 60 being in longitudinal alignment with the grooved portion 24a, thereby the clamp pin 64 is retracted from the groove 54a to permit rotation of the adaptor ring 54. In this assembling operation, the diaphragm control ring arm 51a enters the right side of the aperture value transmitting ring arm 21b at a location spaced apart therefrom by a very small distance as shown in FIG. 3. Next, the adapter ring 54 is turned from the attached position to the rigidly secured position, thereby the arm 62 is moved to the left as viewed in the figure to release the arm 51a. In the case where the diaphragm preselecting ring 55 is set in the full open aperture position, the position of the ring 51 remains unchanged because the arm 51b is latched by the arm 56. As the preselecting ring 55 is turned from the full open aperture position to the minimum aperture position, the arm 56 is moved to the left to permit the diaphragm control ring 51 to be rotated under the action of spring 65. Such rotation of ring 51 causes downward movement of the transmitting slide 5 against the force of the spring 6. When the preselecting ring 55 is moved beyond the manually operating diaphragm range to the EE position, the camming surface of the ring 55 causes rearward movement of the cam follower pin 22 which in turn causes clockwise movement of the latching lever 7 through the actuating rod 9, thereby the scanning slide 2 is released from the latching lever 7. At this time, however, the scanning slide 2 does not move upward because the shutter release member is in the inoperative position.

The automatic diaphragm control operation of the entire assembly of the camera body C, intermediate barrel I and lens barrel L of FIGS. 1, 2 and 3 is as follows. When the camera is aligned with an object intended to be photographed, the needle 1a of the exposure meter 1 is deflected to a position which is a function of the level of brightness of the object. Next, when the shutter button is depressed to cause downward movement of the release plunger 12, the position of the deflected needle 1a is detected by the scanning slide 2 at its stepped scanning face 2a. The scanning result of the position of the needle 1a is introduced to the diaphragm presetting ring 57 through the transmitting slide 5, aperture value transmitting ring 21 and diaphragm control ring 51. As soon as the automatic presetting of the diaphragm has been effected, the diaphragm drive lever 10 is operated and the diaphragm driving motion is transmitted through the transmitting ring 23 and the diaphragm operating ring 53 to the diaphragm drive ring 58, thereby the size of the diaphragm aperture is adjusted to the presetting.

When the photographer removes his or her finger from the shutter button, the scanning slide 2 is moved downward against the force of the spring 4 by the lever 13 as the lever 13 is turned counter-clockwise under the action of the return spring 12b of which the bias is stronger than that of the spring 4. On the other hand, the rings 57, 51 and 21 are returned to the minimum aperture positions under the action of the spring 65, and the transmitting slide 5 is also returned to the downmost position against the force of the spring 6 as the force of the spring 65 is applied to the slide 5 through the rings 21 and 51.

In order to switch the camera from the automatic to the manual diaphragm control mode, the diaphragm preselecting ring 55 is turned from the EE position, thereby the camming surface 61 is moved away from the cam follower pin 52 at its head, and then causes forward movement of the cam follower pin 52 which in turn causes latching engagement of the lever pawl 7a with the scanning slide projection 2c to render inoperative the automatic diaphragm control apparatus. In this arrangement, the preselecting ring 55 may be turned to place a desired diaphragm value in registry with the index, thereby the position of the presetting ring 57 is adjusted in conformance with the preselected diaphragm value, while permitting the movement of the preselecting ring 55 without production of any effect on the operation of the exposure meter 1.

For demounting the interchangeable lens barrel L and the intermediate barrel I from each other and from the camera housing, the adapter rings 25 and 54 may be turned from the rigidly secured positions to the detachable positions wherein the rings 21 and 51 are set to the full open aperture positions by the arms 36 and 62 respectively. It is to be understood from this fact that the assembling of the interchangeable lens barrel L and intermediate barrel I may proceed the assemblying of the intermediate barrel I and the camera body C as has been described above.

Figure 4:
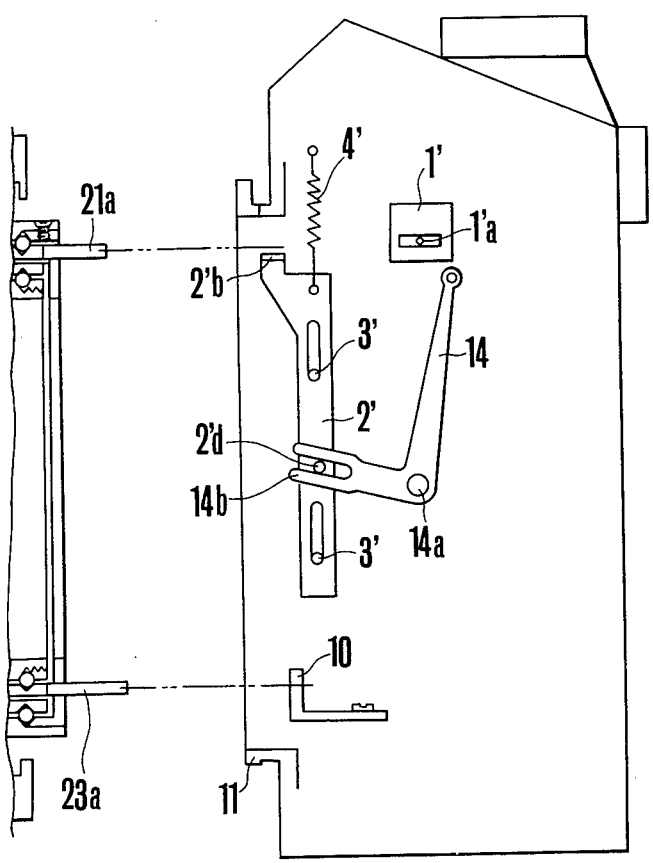
FIG. 4 is an elevation view of a camera of the type having an exposure meter needle-follow-diaphragm adjustment mechanism.

Referring to FIG. 4, there is shown a diaphragm control apparatus of the type in which the adjustment of the diaphragm in accordance with the object brightness level is effected by turning the diaphragm preselecting ring 55 to a position where a follow pointer is in alignment with the needle of an exposure meter. There is shown an exposure meter 1' having a needle 1'a. There is also shown a follow pointer 14 arranged to cooperate with the needle 1'a of the exposure meter 1' and having a forked portion 14b engaging a pin 2'd mounted on a slide 2' similar in construction and operation to the transmitting slide 5 of FIG. 1. The slide 2' has a pair of elongated slots for fixed guide pin 3' and is biased upward by a helical spring 4'. As the diaphragm preselecting ring 55 is turned from the full open aperture position to the minimum aperture position, the diaphragm presetting ring 57 is turned in the same direction as that of the preselecting ring 55 under the action of the spring 65, and simultaneously the motion of the preselecting ring 55 is transmitted through the rings 51 and 21 of FIG. 1 to the slide 2', thereby the slide 2' is moved downward. Such downward movement of slide 2' causes counter-clockwise movement of the follow pointer 14 about its pivot pin 14a, so that when the follow pointer 14 is brought into alignment with the needle 1'a of the exposure meter 1', the diaphragm is adjusted to a presetting dependent upon the object brightness level. The subsequent operation may proceed in a manner similar to that described in connection with the FIGS. 1, 2 and 3. It is to be noted that the aperture value transmitting ring 21 of the intermediate barrel I of the present invention may be considered as a member serving to transmit the preselected diaphragm value from the interchangeable lens barrel to the camera body.

Figure 5:
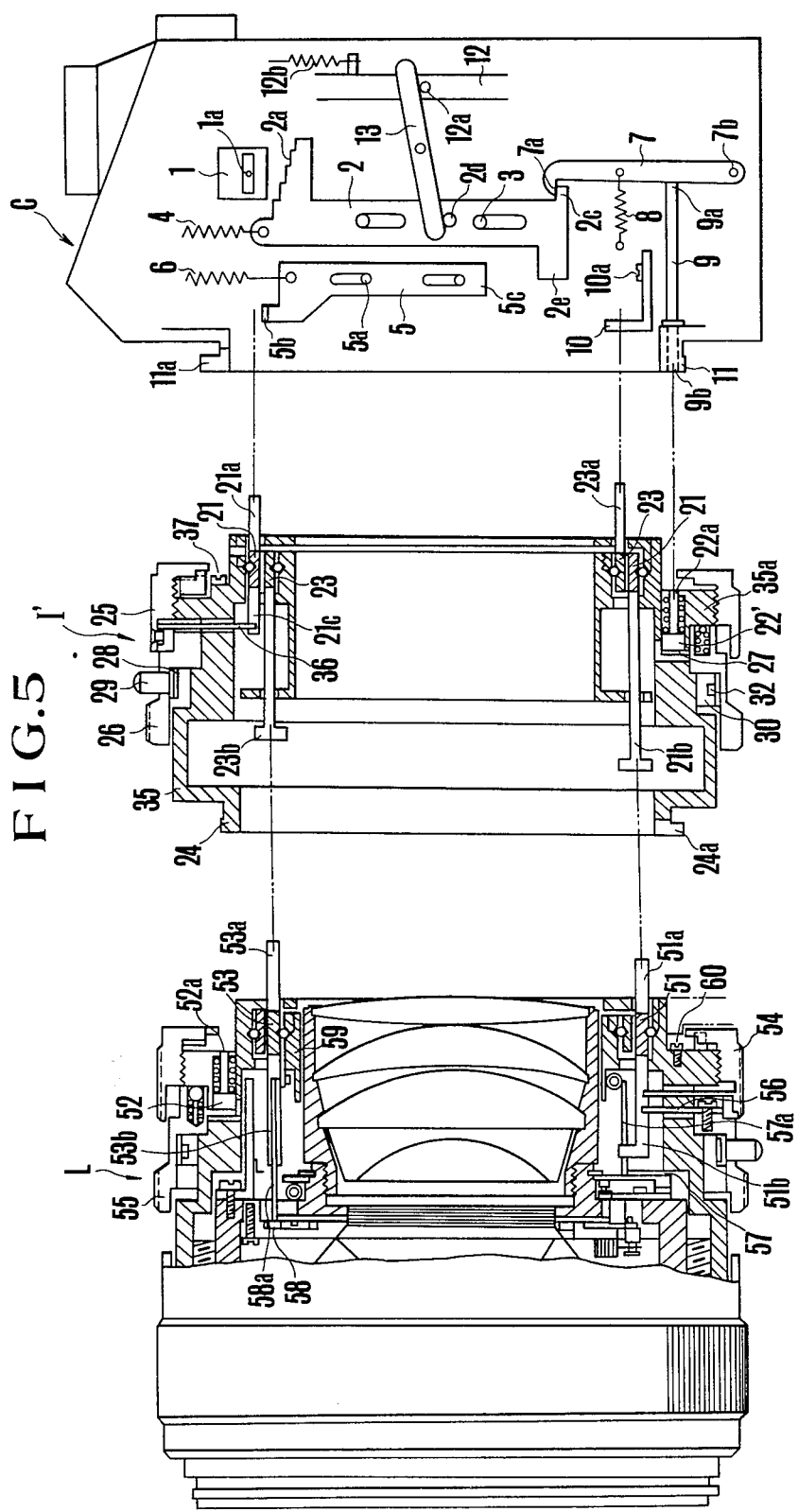
FIG. 5 is a sectional elevation view showing another embodiment of an intermediate barrel provided with means for selecting either of the automatic and manual diaphragm control modes according to the present invention.
Figure 6:
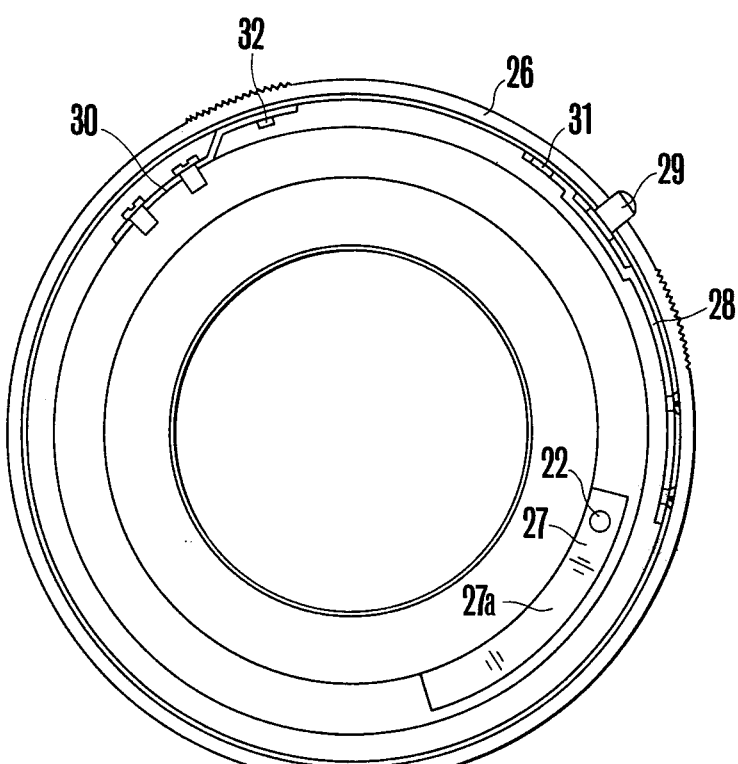
FIG. 6 is a sectional view of the intermediate barrel of FIG. 5 taken along a line perpendicular to the optical axis of the camera.
Figure 7:
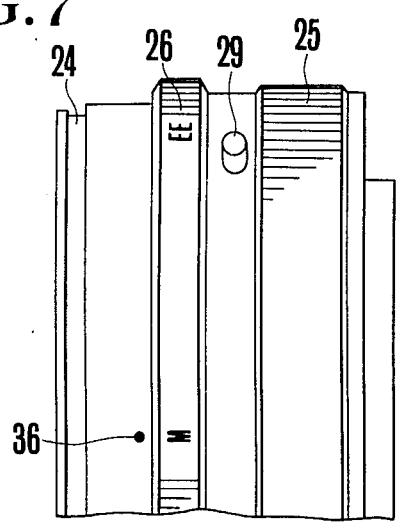
FIG. 7 is a fragmentary side view of the intermediate barrel with the mode selecting ring of FIG. 5.

Whilst the above mentioned embodiment of the invention provides an intermediate barrel adapted for use with an interchangeable lens barrel having means for selecting either of the automatic and manual diaphragm control modes, the embodiment of FIG. 5 is concerned with an intermediate barrel provided with the mode selecting means. The mode selecting means comprises a selector ring 26 having symbols EE and M as shown in FIG. 7 cooperative with a stationary index 36. The selector ring 26 is provided with a slant camming surface 27 as shown in FIG. 6, on which a cam follower pin 22' rides in slidably contact relation thereto under the action of a spring. In order to insure that the selector ring 26 is held in the EE position from accidental motion, there is provided a clamping mechanism which comprises a clamp spring 28 having a release button 29 accessible from the outside of the intermediate barrel and mounted on the inner peripheral surface of the ring 26 and a clamp pin 32 mounted on a restricting plate 30 affixed to the tubular body 35. Unlike the first embodiment, the second embodiment employs a slightly different acceptor mount base ring 24 in that the angular position control grooved portion 24a is displaced by an angle of 180° from the position of the grooved portion 11a of the camera body C, and therefore, the interchangeable lens barrel is attached to the intermediate barrel L at an angular position displaced by an angle of 180° from that of FIG. 1. For this reason, the rear arms 51a and 53a are arranged in vertically opposite relation to those of FIG. 1, and the front arms 21b and 23b of the intermediate barrel I are correspondingly arranged in vertically opposite relation those of FIG. 1, but the operation of the entire assembly of the camera body C, and barrels I and L is similar to that shown in connection with FIG. 1.

With this arrangement of the mode selecting means, it is possible to switch the camera between the automatic and manual diaphragm control modes. When the selector ring 26 is moved from the M position to EE position, the cam follower pin 22' is moved rearwardly causes rearward movement of the actuating rod 9, thereby the automatic diaphragm control apparatus is rendered operative. Therefore, an interchangeable lens barrel having no mode selecting means may be selected for employment with the intermediate barrel constructed in accordance with the second embodiment of the invention in order to perform the automatic presetting of the diaphragm. When the selected interchangeable lens barrel is of the type having mode selecting means, the automatic presetting of the diaphragm can be performed without causing interference between the cam follower pins of the interchangeable lens barrel L and the intermediate barrel I, as the diaphragm is conditioned in the automatic diaphragm control mode and the diaphragm control apparatus is also rendered operative in the automatic diaphragm control range.

It will be seen from the foregoing description that the present invention contemplates the use of a transmitting member as arranged to be rotatable within the intermediate barrel and to serve either for transmitting the scanning result from the camera body to the interchangeable lens barrel when the camera is of the type having an automatic diaphragm control apparatus, or for transmitting the preselected diaphragm value from the interchangeable lens barrel to the camera body when the camera is of the type in which the diaphragm adjustment is effected in a needle follower manner or in a constant point manner, thereby giving an additional advantage of making it possible to perform the arranging and focusing of an image in a brighter field of view than was previously possible as the full open aperture light metering mode is employed, as well as the determination of an exposure value even when close photography is made by the help of an intermediate barrel or extension tube inserted between the interchangeable lens barrel and the camera body.

What is claimed is:

1. An intermediate barrel for use in close photography with a single lens reflex camera, said intermediate barrel being adapted to be insertable between the interchangeable lens mount and body of said camera, said interchangeable lens mount being provided with a diaphragm arrangement selectively operative in automatic and manual diaphragm control modes, and diaphragm presetting means, and said camera body having diaphragm value determining means, which intermediate barrel comprises;
    a. coupling means for interconnecting said interchangeable lens mount and said camera body in predetermined angular-spaced relation to each other,
    b. diaphragm value transmitting means arranged to be engageable with said diaphragm presetting means and said diaphragm value determining means, and
    c. diaphragm driving motion transmitting means arranged to be engageable with diaphragm drive means in said camera body and with diaphragm operating means in said interchangeable lens mount.

2. An intermediate barrel according to claim 1, further comprising means for transmitting a signal representative of whether said diaphragm arrangement is operative in the automatic or manual diaphragm control mode from said interchangeable lens mount to said diaphragm value determining means.

3. An intermediate barrel according to claim 1, further comprising manually operable means for selecting either of the automatic and manual diaphragm control modes.

4. An intermediate barrel according to claim 1, further comprising means for locating said diaphragm value transmitting means in a predetermined position in cooperation with said coupling means.

5. An intermediate barrel for use in close photography with a single lens reflex camera, said intermediate barrel being adapted to be insertable between the interchangeable lens mount and body of said camera, said body having automatic diaphragm control means and diaphragm drive means, and said interchangeable lens mount being provided with diaphragm means, diaphragm presetting means, manually operable means for said presetting means and means for selecting either automatic and manual diaphragm control mode, which intermediate barrel comprises;
    a. position control means for securing said intermediate barrel to said camera body in predetermined angular spaced relation to each other,
    b. fastening means rotatable on the outer peripheral surface of said intermediate barrel,
    c. first interconnecting means for operatively interconnecting said automatic diaphragm control means and said diaphragm presetting means arranged to be rotatable about the optical axis; and
    d. second interconnecting means for operatively interconnecting said diaphragm drive means and said diaphragm means.

6. An intermediate barrel according to claim 5, further including means for transmitting a signal representative of the position of said mode selecting means from said interchangeable lens mount to said automatic diaphragm control means in said camera body.

* * * * *